(12) United States Patent
Ichimasa

(10) Patent No.: US 6,317,565 B1
(45) Date of Patent: *Nov. 13, 2001

(54) LENS SHUTTER CAMERA HAVING VIEWING LINE DETECTOR

(75) Inventor: Shoji Ichimasa, Chigasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/888,292

(22) Filed: Jul. 3, 1997

Related U.S. Application Data

(63) Continuation of application No. 08/328,709, filed on Oct. 25, 1994, now abandoned.

(30) Foreign Application Priority Data

Oct. 29, 1993 (JP) .................................................... 5-292485

(51) Int. Cl.[7] ............................. G03B 3/10; G03B 13/10; G03B 13/34
(52) U.S. Cl. ............................................. 396/123; 396/379
(58) Field of Search ............................. 396/148, 84, 121, 396/123, 378, 379

(56) References Cited

U.S. PATENT DOCUMENTS

| | | | |
|---|---|---|---|
| 5,151,583 | * 9/1992 | Tokunaga et al. | 354/406 |
| 5,200,774 | * 4/1993 | Nakajima | 354/219 |
| 5,239,337 | * 8/1993 | Takagi et al. | 354/443 |
| 5,245,371 | * 9/1993 | Nagano et al. | 354/219 |
| 5,262,807 | * 11/1993 | Shindo | 351/210 |
| 5,291,234 | * 3/1994 | Shindo et al. | 354/402 |
| 5,311,004 | * 5/1994 | Kusaka | 354/408 |
| 5,333,029 | * 7/1994 | Uchiyama et al. | 354/410 |
| 5,335,035 | * 8/1994 | Maeda | 354/222 |
| 5,365,302 | * 11/1994 | Kodama | 354/403 |
| 5,473,403 | * 12/1995 | Suda et al. | 354/409 |
| 5,515,130 | * 5/1996 | Tsukahara et al. | 354/402 |

FOREIGN PATENT DOCUMENTS 60168111    8/1985   (JP) .

* cited by examiner

Primary Examiner—Christopher Mahoney
(74) Attorney, Agent, or Firm—Fitzpatrick, Cella, Harper & Scinto

(57) ABSTRACT

A camera having a device for detecting a zoom position of a zoom lens, a finder zoomable by being linked to zooming of the zoom lens, a device for detecting a position of a user's gaze in the finder, a range finding device having a plurality of predetermined range finding regions and having a function of forming range finding information on each range finding region, and a selection circuit for selecting at least one of the range finding regions according to the gaze position detected by the gaze position detecting device and the zoom position detected by the zoom position detecting device.

6 Claims, 5 Drawing Sheets

| POSITION OF VIEWING LINE INPUT / ZOOM POSITION | 1 | 2 | 3 | 4 | 5 |
|---|---|---|---|---|---|
| WIDE | A | A | C | E | E |
| WIDE - MIDDLE | A | B and A | C | D and E | E |
| MIDDLE | A | B | C | D | E |
| TELE - MIDDLE | A and B | B | C | D | D and E |
| TELE | B | B and C | C | C and D | D |

| ZOOM POSITION \ POSITION OF VIEWING LINE INPUT | 1 | 2 | 3 | 4 | 5 |
|---|---|---|---|---|---|
| WIDE | A | A | C | E | E |
| WIDE - MIDDLE | A | B and A | C | D and E | E |
| MIDDLE | A | B | C | D | E |
| TELE - MIDDLE | A and B | B | C | D | D and E |
| TELE | B | B and C | C | C and D | D |

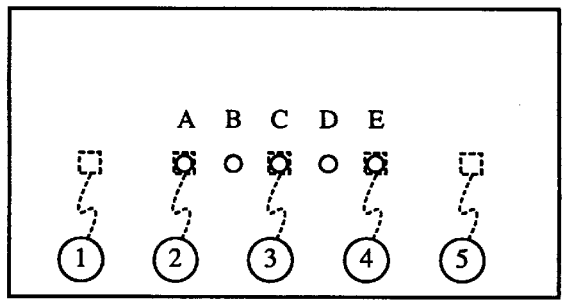
FIG. 5(a) (WIDE)
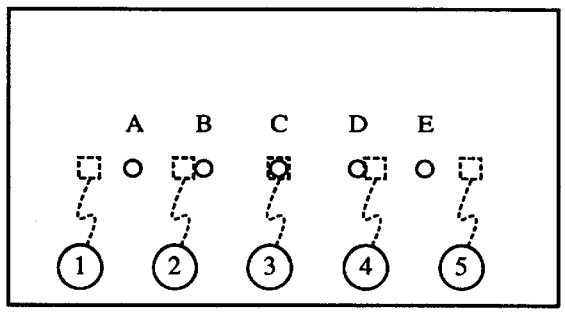
FIG. 5(b) (WIDE - MIDDLE)
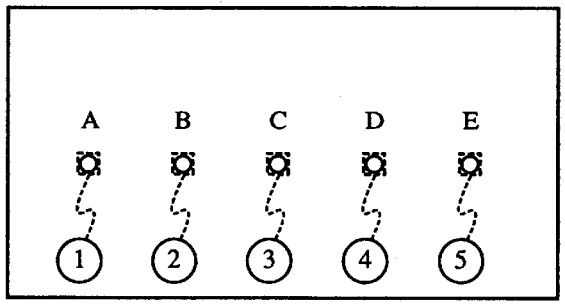
FIG. 5(c) (MIDDLE)
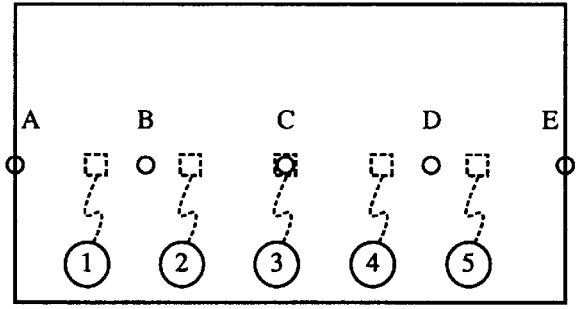
FIG. 5(d) (TELE - MIDDLE)
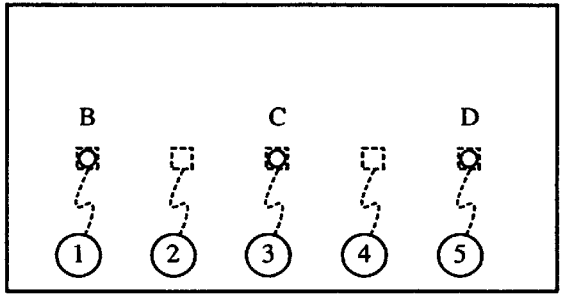
FIG. 5(e) (TELE)

LENS SHUTTER CAMERA HAVING VIEWING LINE DETECTOR

This application is a continuation of application Ser. No. 08/328,709 filed Oct. 25, 1994, now abandoned.

BACKGROUND OF THE INVENTION

1. Field of the Invention

The present invention relates to an improvement in a lens shutter camera having a zooming function and having a zoom finder capable of selecting any one of a plurality of range finding regions by a viewing line input operation.

2. Description of the Related Art

Lens shutter cameras having a zooming function and a wide-field range finding function, i.e., a function of obtaining range finding information from each of a plurality of range finding regions in a picture frame, are known.

In this kind of camera, range finding regions (range finding positions) are changed with respect to zoom positions in such a manner as disclosed in Japanese Patent Laid-Open No. 60-168111.

On the other hand, single reflex lens cameras in which range finding regions can be freely selected by a viewing line input have recently been developed as products. A viewing line input function for selecting the range finding region may also be added to the above-mentioned lens shutter cameras.

However, the optical axes of a view finder and a range finder do not coincide with each other in lens shutter cameras while the optical axes of a view finder and a range finder coincide with each other in TTL (Through The Lens) type cameras. Accordingly, it is possible that in a lens shutter camera in which a photo-taking lens is a zoom lens and in which a view finder can also perform zooming, a misalignment will occur between a range finding region and a viewing line input position at some zoom position. A situation where a misalignment between a range finding region and a viewing line input position is large or where such a misalignment is not predicted results in failure to focus the photo-taking lens on an object that a photographer wishes to photograph.

BRIEF DESCRIPTION OF THE DRAWINGS

FIGS. 5(a) through 5(e) are diagrams showing viewing line input positions and range finding regions at different zoom positions.

SUMMARY OF THE INVENTION

An object of the present invention is to suitably operate a lens shutter camera by an output from a viewing line (gaze position) detecting device.

Another object of the present invention is to make it possible to perform correctly focused photography with a camera having a device for detecting the direction of a line along which a user is gazing on an object through a view finder, even if the optical axis of the view finder and the optical axis of a range finder do not coincide with each other.

To achieve these objects, according to the present invention, there is provided a camera comprising a photo-taking lens capable of zooming, a zoom ratio detection means for detecting a set zoom ratio of the photo-taking lens, a finder zoomable in synchronization with zooming of the photo-taking lens, a gaze position detection means for detecting a position of a user's gaze in the finder, range finding means having a plurality of range finding regions; and selection means for selecting at least one of the range finding regions of the range finding means according to the gaze position detected by the gaze position detection means and the set zoom ratio detected by the zoom ratio detection means.

These and other objects, features and advantages of the present invention will become apparent from the following detailed description of the invention.

DESCRIPTION OF THE PREFERRED EMBODIMENT

A preferred embodiment of the present invention will be described below with reference to the accompanying drawings.

Figure 1A:
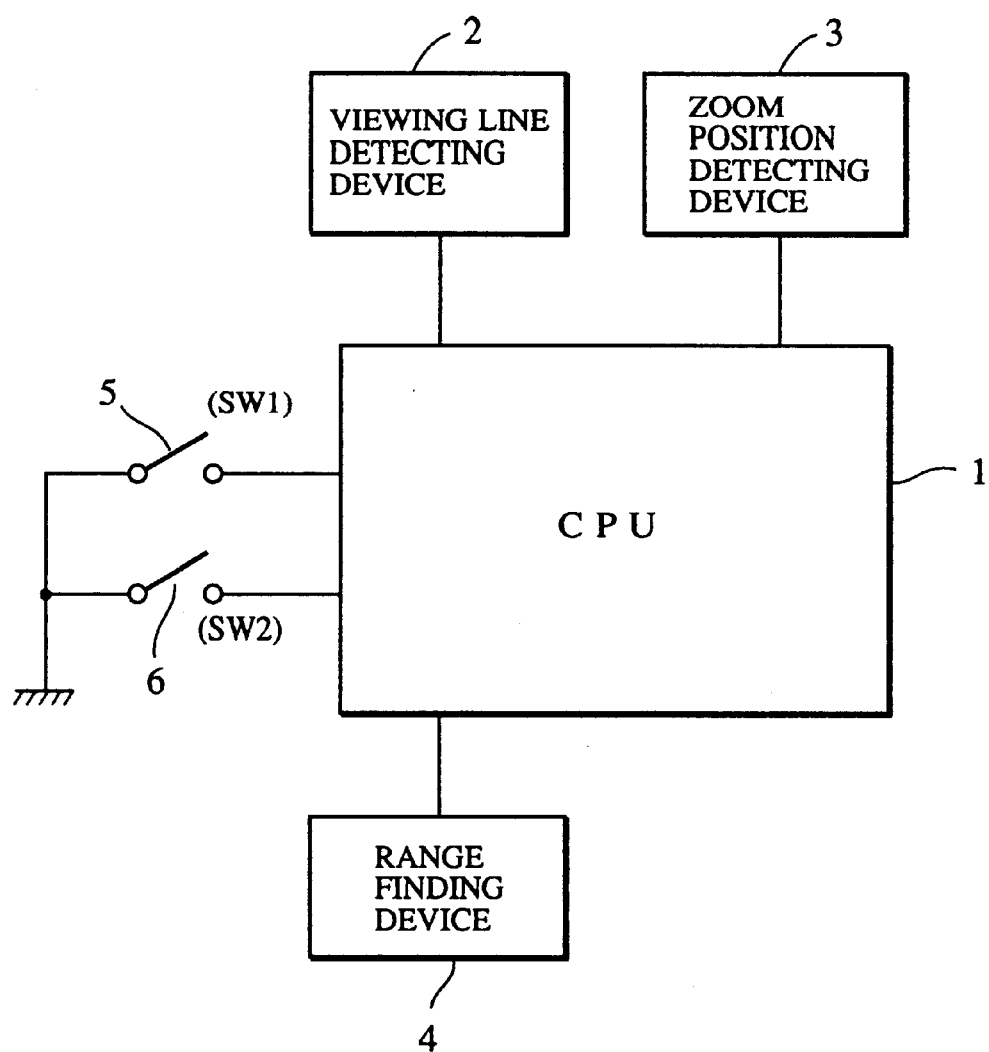
FIG. 1A is a block diagram showing electrical connections between component units of an embodiment of the present invention.

FIG. 1A shows, as essential components of a lens shutter camera having a zooming function in accordance with an embodiment of the present invention, a CPU 1 for performing an overall sequential control, a viewing line detecting device 2 for detecting the position of a viewing line along which a photographer is gazing on an object through a view finder, a zoom position detecting device 3 for detecting zoom positions at which a photo-taking lens is set for zooming, a range finding or focus detecting range finding or focus detecting device 4 for in a plurality of range finding or focus detecting regions in a picture frame, a switch 5 (SW1), which is turned on by a first half stroke of a shutter release button, and a switch 6 (SW2), which is turned on by a second half stroke of the shutter release button.

Figure 1B:
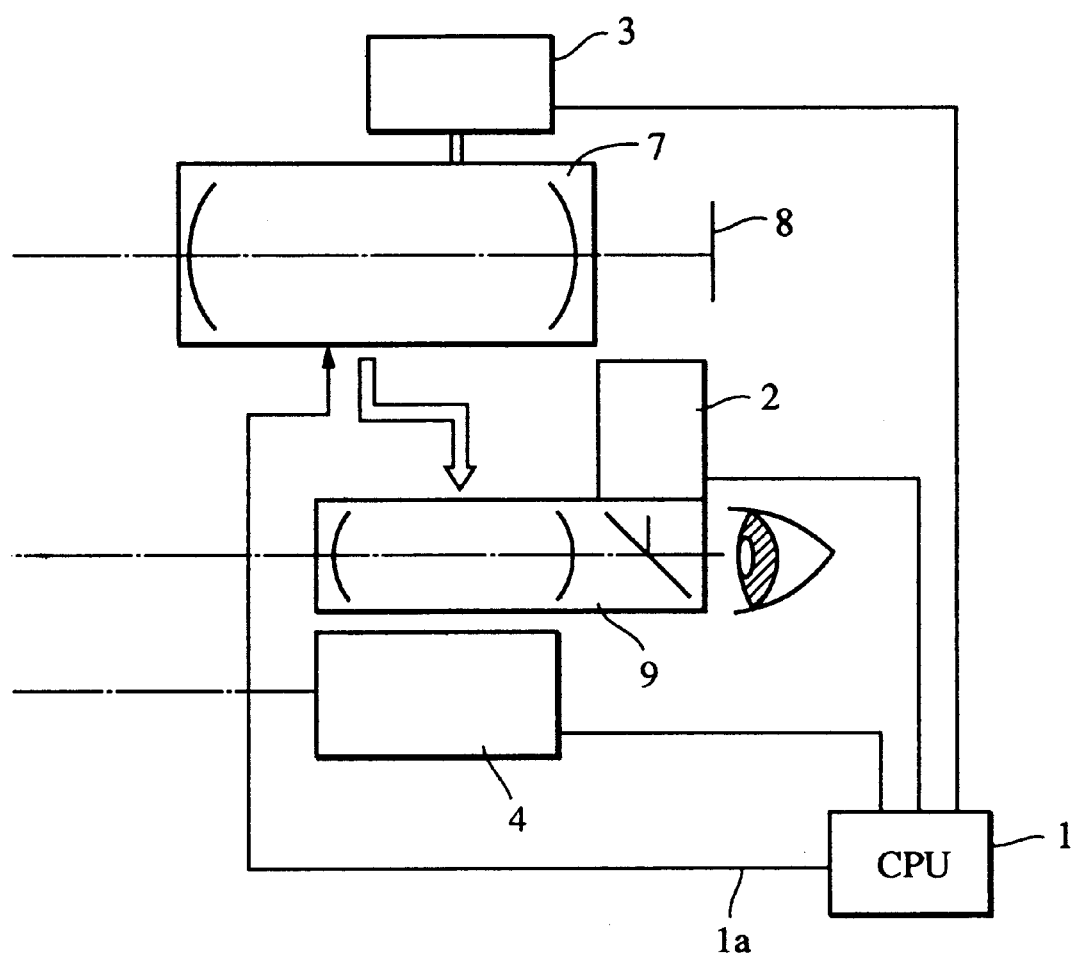
FIG. 1B is a diagram of the arrangement of the component units of the embodiment of the invention.

Referring to FIG. 1B, a photo-taking lens 7 is formed of a zoom lens unit including a focusing lens, and has a focal plane 8. A film or a solid-state image pickup device is placed at the focal plane 8. The zoom position detecting device 3 is connected to the photo-taking lens 7 to detect the zoom position of the photo-taking lens 7. The view finder, shown as a unit 9, is a zooming finder which is linked to zooming of the photo-taking lens 7 to perform its zooming operation. The viewing line detecting device 2 is optically combined with the finder 9, for example, through a dichroic mirror to detect a point at which the photographer is gazing in the finder.

Figures 3, 4:
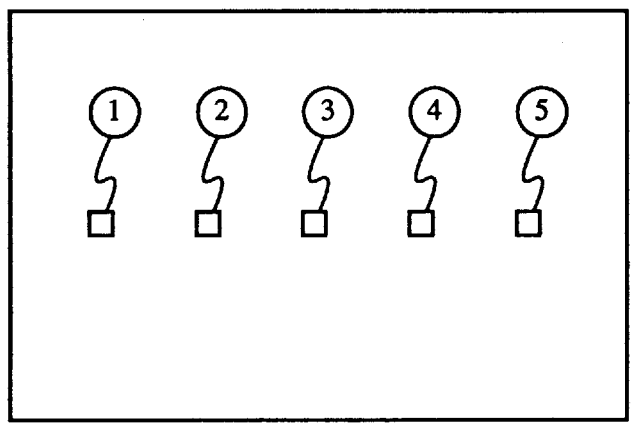
FIG. 3 is a diagram showing range finding regions stored in an internal memory of the CPU and each selected according to a zoom position and a viewing line input position.
FIG. 4 is a diagram showing positions in a finder view field at which a viewing line input is received.

FIG. 4 is a diagram showing positions in the finder 9 at which a viewing line input is received, i.e., viewing line input positions ① to ⑤, which are indicated by marks previously formed in the finder. The distances between the viewing line input positions ① to ⑤ are fixed.

FIGS. 5(a) through 5(e) are diagrams showing the relationship between the viewing line input positions and the range finding regions at each zoom position. Circles A to E represent the range finding regions.

More specifically, FIG. 5(a) shows the relationship between the viewing line input positions and the range finding regions at a wide zoom position, FIG. 5(b) shows the relationship at a wide-middle zoom position, FIG. 5(c) shows the relationship at a middle zoom position, FIG. 5(d)

shows the relationship at a telephoto-middle zoom position, and FIG. 5(e) shows the relationship at a telephoto zoom position.

At the middle zoom position, the viewing line input positions and the range finding regions coincide with each other, as shown in FIG. 5(c). At the other zoom positions, however, misalignments occur between the viewing line input positions and the range finding regions. Therefore, it is necessary to determine, after the detection of a user's gaze point by the viewing line detecting device 2, one of the range finding regions of the range finding device 4 from which information for calculating a signal 1a for focusing the photo-taking lens is obtained.

Figure 2:
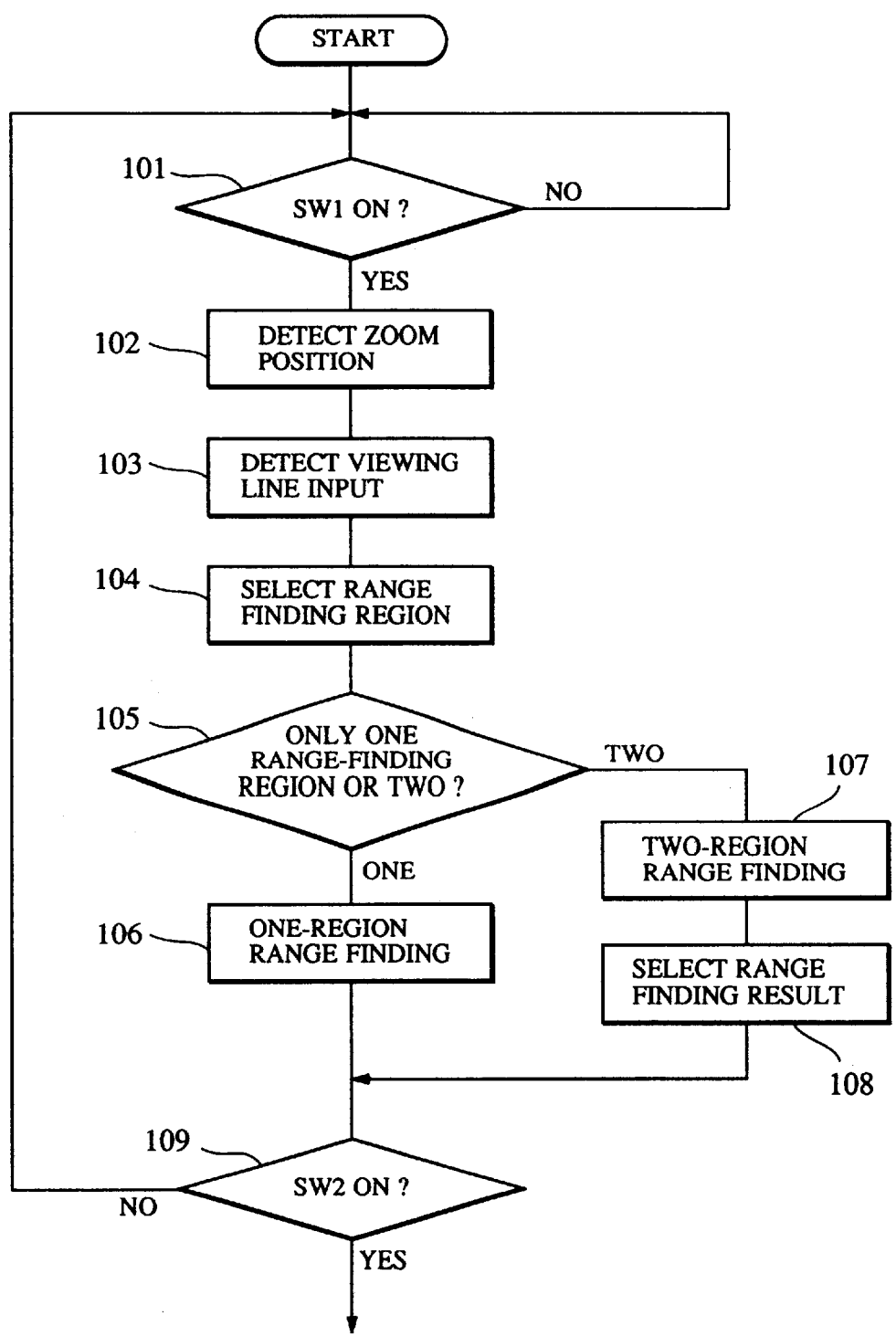
FIG. 2 is a flow chart of the operation of a CPU.

FIG. 2 is a flowchart of the operation of the CPU 1, and FIG. 3 is a table showing the range finding regions selected according to the zoom positions and the viewing line input positions.

The operation of the CPU 1 will be described with reference to the flowchart of FIG. 2 and to FIG. 3. The correspondence relationship between the zoom positions, the viewing line input positions and the range finding regions selected form the zoom positions and the viewing line input positions is stored as a table in a ROM provided in the CPU 1 shown in FIGS. 1A and 1B.

[Step 101] A determination is made as to whether the shutter release button (not shown) has been operated through the first half stroke to turn on the switch SW1. If YES, well-known operations for battery checking and photometry and other operations are performed and the process advances to Step 102.

[Step 102] The present zoom position of the photo-taking lens 7 is detected by the zoom position detecting device 3, and the process advances to Step 103.

[Step 103] The viewing line detecting device 2 is operated to input information designating one of the viewing line positions ① to ⑤ at which the photographer is viewing an object, and the process advances to Step 104.

[Step 104] At least one of the range finding regions is selected in accordance with the relationship in the table of FIG. 3 between the zoom position information obtained in Step 102 and the viewing line position information obtained in Step 103.

A case where the present zoom position is the telephoto position and where one of the viewing line input positions ①, ③ and ⑤ shown in FIG. 5(e) has been selected will be described.

[Step 105] A determination is made as to whether one of the range finding region has been selected (the viewing line input position and one of the range finding regions coincide with each other) or two of the range finding regions are selected (the viewing line input position does not coincide with any one of the range finding regions, and two of the range finding regions adjacent to the viewing line input position are selected). In this case, since the viewing line input positions ①, ③ and ⑤ and the range finding regions coincide with each other, it is determined that there is only one selected range finding region, and the process advances to Step 106.

[Step 106] The range finding device 4 is instructed to find a range in the range finding region B, C or D corresponding to the viewing line input position ①, ③ or ⑤, and a lens driving amount is calculated on the basis of range finding information thereby obtained. The process then advances to Step 109.

A case where the present zoom position is the telephoto position and where one of the viewing line input positions ② and ④ shown in FIG. 5(e) has been selected will next be described.

In this case, there is no range finding region coinciding with the viewing line input position ② or ④, and the range finding regions B and C or C and D in the vicinity of the viewing line input position ② or ④ are therefore selected in Step 105. Since there are two range finding regions in this case, the process moves from Step 105 to Step 107.

[Step 107] The range finding device 4 is instructed to find ranges through the range finding regions B and C or C and D selected with respect to the viewing line input positions ② and ④ to input range finding information, and the process advances to Step 108.

[Step 108] Range finding information designating a shorter range among the range finding information obtained with respect the range finding regions B and C, or C and D is selected and a lens driving amount is calculated on the basis of this selected range finding information. The process then advances to Step 109.

[Step 109] A determination is made as to whether the shutter release button has been operated through the second half stroke to turn on the switch SW2. If the switch SW2 is still in the off state, the process returns to Step 101 to repeat the same operation. If it is determined that the switch SW2 has been turned on, then a well-known film exposure operation is started.

In a case where the present zoom position is the telephoto-middle position and where the viewing line input position ① or ⑤ has been selected, there is no range finding region coinciding with the viewing line input position ① or ⑤, and the range finding regions A and B or D and E in the vicinity of the viewing line input position ① or ⑤ are therefore selected as effective range finding regions. Since there are two range finding regions in this case, the process moves from Step 105 to Step 107. Range finding information designating a shorter range among the range finding information obtained with respect the two range finding regions is selected and a lens driving amount is calculated on the basis of this selected range finding information.

In a case where the present zoom position is the telephoto-middle position and where the viewing line input position ② or ④ has been selected, there is also no coinciding range finding region, and the range finding regions in the vicinity of the viewing line input position are selected on which to use range finding information. In accordance with the table shown in FIG. 3, the region B or D closest to the viewing line input position ② or ④ is selected. Alternatively, the regions B and C or C and D may be selected and range finding information designating a shorter range may be used.

The viewing line input position ③ coincides with the range finding region C, and range finding information on this region is therefore used.

When the photo-taking lens is at the middle zoom position, the viewing line input positions and the range finding regions coincide with each other, and range finding information on one of the range finding regions corresponding to a selected one of the viewing line input positions is used.

When the photo-taking lens is at the wide-middle zoom position, the viewing line input positions ①, ②, ④ and ⑤ do not coincide with the range finding regions. Then, with respect to the viewing line input position ① or ⑤, the region A or E closest to this viewing line input position is selected. In the case of the viewing line input position ② or ④, the regions A and B, or D and E close to this viewing line input position are selected in accordance with the table shown in FIG. 3, and range finding information designating a shorter range is used. Alternatively, only the range finding region B may be selected with respect to the viewing line input position ②, and only the range finding region D with respect to the viewing line input position ④.

When the photo-taking lens is at the wide zoom position, the viewing line input positions ②, ③ and ④ coincide with the range finding regions A, C and E, and information on the range finding region corresponding to a selected one of the viewing line input positions is used. With respect to the viewing line input position ① or ⑤, information on the closest range finding regions A or E is used.

Thus, in the above-described embodiment, at least one of the range finding regions is selected in accordance with a predetermined table, such as that shown in FIG. 3, using zoom position information and viewing line input. It is therefore possible to obtain range finding information at a position most suitable for a photographer's intention and to achieve an optimal photographic effect.

According to the present invention, as described above, a range finding view selection means is provided to select range finding regions effective in range finding of a range finding means from a viewing line position detected by a viewing line detection means and a zoom position detected by a zoom position detection means. Range finding regions effective in finding a suitable range are selected on the basis of information on the viewing line position and the zoom position detected.

As described above, a photographer can perform photography by suitably focusing the lens on an object that the photographer intends to photograph.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structure and functions.

What is claimed is:

1. A camera comprising:

a photo-taking lens capable of zooming;

a zooming state detection device that detects a zooming state of said photo-taking lens;

a view finder zoomable in synchronization with zooming of said photo-taking lens;

a viewing line detection device having a plurality of viewing line detecting areas, where respective positions of said viewing line detecting areas are fixed in said zoomable view finder regardless of the zooming state of said view finder, and said viewing line detection device detects which viewing line detecting area includes a user's viewing line;

a range finding device having a plurality of range finding areas, where respective positions of range finding areas are varied in said view finder in accordance with the zooming state of the view finder, and said range finding device performs respective range finding operations in each of said range finding areas; and a selection device including a table of correspondence relationships among the zooming state of said view finder, the range finding areas and the viewing line detecting areas stored in memory, where the zooming state and the viewing line detection areas are factors, and the table stores information that determines range finding areas, wherein said selection device sets the viewing line detecting areas detected by the viewing line detection device and the zooming state detected by the zooming state detection device as factors of the table, reads out at least one piece of information stored in the table, and selects a range finding area.

2. A camera according to claim 1, wherein said selection device selects two of the range finding areas when the user's viewing line is included in a predetermined viewing line detecting area.

3. A camera according to claim 2, wherein said selection device selects one range finding area of said two selected range finding areas that can be focused at a position closer to the camera.

4. A camera comprising:

a photo-taking lens capable of zooming;

a zooming state detection device that detects a zooming state of said photo-taking lens;

a view finder zoomable in synchronization with zooming of said photo-taking lens;

a viewing line detection device having a plurality of viewing line detecting areas, where respective positions of viewing line detecting areas are fixed in said zoomable view finder regardless of the zooming state of said view finder, and said viewing line detection device detects which viewing line detecting area includes a user's viewing line;

a range finding device having a plurality of range finding areas, where respective positions of range finding area are varied in said view finder in accordance with the zooming state of the view finder, and said range finding device performs respective range finding operations in each of said range finding areas;

a memory that stores information for indicating range finding areas; and a selection device that reads out information stored in said memory, indicating a range finding area, by setting a zooming state and reviewing line detection area in accordance with a detected zooming state and reviewing line detection area.

5. A camera according to claim 4, wherein said selection device selects two of said range finding areas when the user's viewing line is included in a predetermined viewing line detecting area.

6. A camera according to claim 5, wherein said selection device selects one range finding area from the two selected range finding areas that can be focused at a position closer to the camera.

* * * * *

UNITED STATES PATENT AND TRADEMARK OFFICE
CERTIFICATE OF CORRECTION

PATENT NO.    : 6,317,565 B1
DATED         : November 13, 2001
INVENTOR(S)   : Shojiichimasa It is certified that error appears in the above-identified patent and that said Letters Patent is hereby corrected as shown below:

Title page,
Item [56], FOREIGN PATENT DOCUMENTS: "60168111" should read
-- 60-168111 --.

Column 2,
Line 35, "range finding or" should be deleted.
Line 36, "focus detecting device 4 for" should read -- device 4 for range finding or focus detecting --.

Column 4,
Line 14, "respect the" should read -- respect to the --.
Line 35, "respect the" should read -- respect to the --.

Column 6,
Line 37, "area" should read -- areas --.

Signed and Sealed this

Twenty-fifth Day of June, 2002

Attest:

JAMES E. ROGAN
Attesting Officer        Director of the United States Patent and Trademark Office